UNITED STATES PATENT OFFICE.

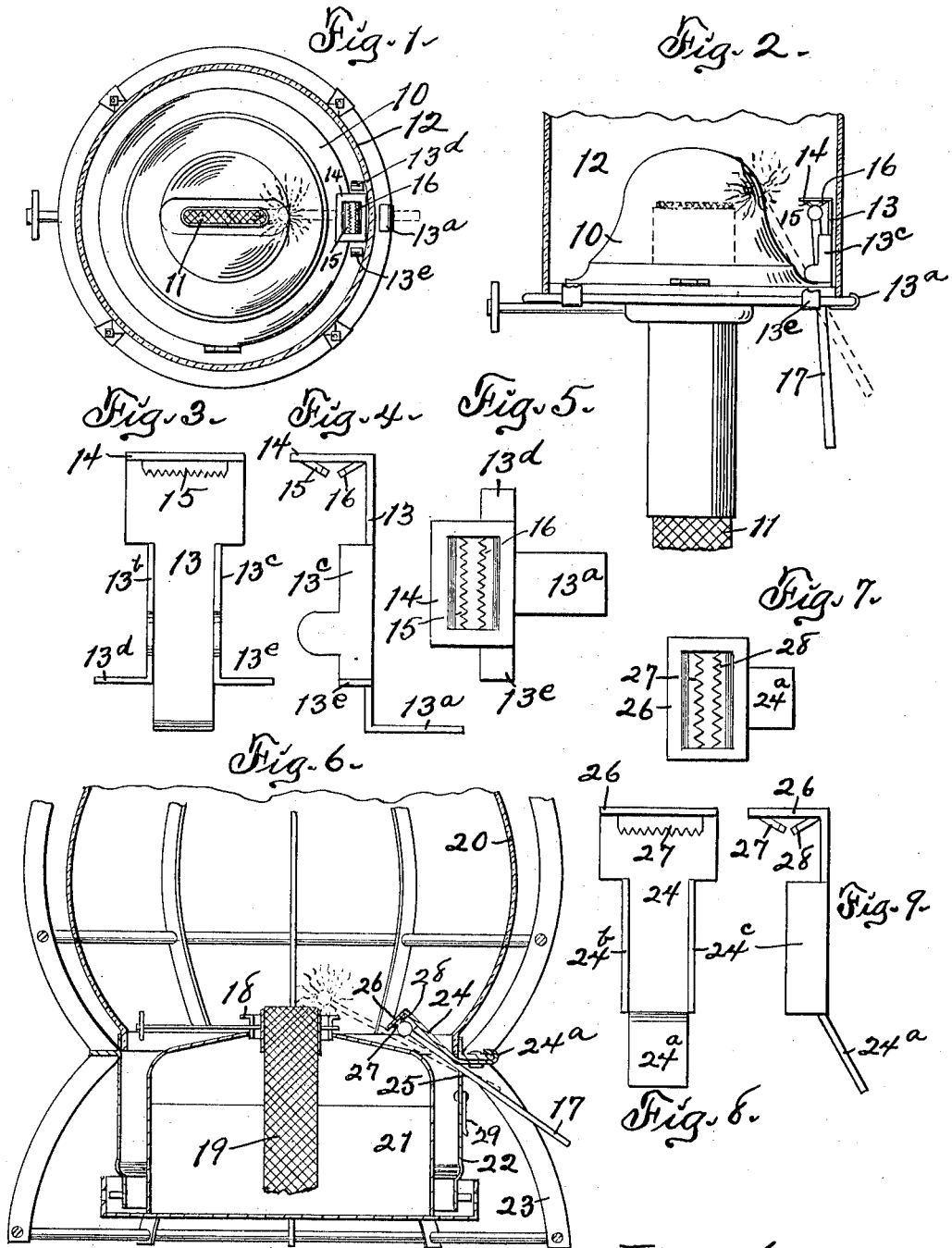

EDWARD S. TAYLOR, OF DES MOINES, IOWA.

LAMP-BURNER.

1,048,761.

Specification of Letters Patent.

Patented Dec. 31, 1912.

Application filed September 9, 1911. Serial No. 648,542.

*To all whom it may concern:*

Be it known that I, EDWARD S. TAYLOR, a citizen of the United States of America, and resident of Des Moines, Polk county, Iowa, have invented a new and useful Lamp-Burner, of which the following is a specification.

The object of this invention is to provide means for lighting a lamp or lantern without removing the chimney therefrom and without exposing the lighting medium outside the lamp or lantern.

A further object of this invention is to provide means for lighting a lamp or lantern without exposing the lighting medium outside the same.

A further object of this invention is to provide means for igniting a lighting medium inside of a lamp or lantern.

My invention consists in the construction, arrangement and combination of elements hereinafter set forth, pointed out in my claims and illustrated by the accompanying drawing, in which—

Figure 1 is a plan, partly in section, of a lamp burner showing my improvement applied thereto. Fig. 2 is an elevation, partly in section, of a lamp burner showing my improvement applied thereto. Figs. 3, 4 and 5 are detail views of my improved attachment for lamps detached from the burner thereof. Fig. 6 is an elevation, partly in section, of a lantern showing my improvement applied thereto and lighting medium in position to be ignited within the lantern casing, dotted lines indicating the application of the lighting medium to the wick of the lantern burner. Figs. 7, 8 and 9 are detail views of my improved attachment for lantern separate from the lantern and burner thereof.

In the construction of the device as illustrated in Figs. 1, 2, 3, 4 and 5 the numeral 10 designates generally a lamp burner, 11 a wick mounted in said burner and 12 a chimney, all of which may be of any desired construction and are here shown conventionally as a vehicle for illustrating my improvement. A stem 13 is mounted through a suitable aperture in the rim portion of the burner 10 and extends vertically inside the lower portion of the chimney 12. The lower end portion 13ª of the stem 13 is clenched upon the rim of the burner. Side flanges 13ᵇ, 13ᶜ are formed on the stem 13 and ears 13ᵈ, 13ᵉ on the lower end portions of said flanges also are clenched on the rim of the burner 10 at right angles to the end portion 13ª. Thus is the stem 13 rigidly connected to the burner. A head flange 14 is formed on and extends inwardly from the upper end portion of the stem 13 and opposite toothed flanges 15, 16 are bent downwardly within and from the head flange. The toothed margins of the flanges 15, 16 are opposed to each other beneath the head flange 14 and the space formed by striking out said flanges constitutes a draft hole through the head flange. A suitable hole is formed in the rim of the burner 10 between the side flanges 13ᵇ, 13ᶜ, which hole is adapted to admit a lighting medium such as a match 17.

In the practical use of this device a match 17 may be passed upwardly through the hole in the burner rim and between the side flanges 13ᵇ, 13ᶜ until the head of said match contacts with the toothed flanges 15, 16, at which time the match may be twisted manually and be ignited by frictional engagement with the teeth of said flanges. After the match is ignited by engagement with the teeth of the flanges 15, 16 said match may be tilted manually into the positions shown by dotted lines in Figs. 1 and 2 so as to bring the burning head of the match into close proximity to the top of the wick 11, in which position the flame from the match will ignite the oil at the upper end of said wick.

In the construction of the device as shown in Figs. 6, 7, 8 and 9 the numeral 18 designates generally a burner, 19 the wick and 20 the chimney of a lantern of the type ordinarily employed by railroad trainmen and switchmen. This type of lantern has an oil magazine 21 carrying the burner 18 and inclosed by a shell 22, which shell in turn is carried by a frame 23 which surrounds and protects the shell and chimney. A stem 24 is mounted through a suitable hole 25 in the shell 22 beneath the lower end of the chimney 20 and one end portion 24ª of said stem is clenched on a suitable portion of the shell or frame. The stem 24 is formed with side flanges 24ᵇ, 24ᶜ and a head flange 26 extending at an angle downwardly from the upper end of the stem toward the magazine 21. The head flange 26 is formed with opposing spaced toothed flanges 27, 28, preferably constructed by striking out portions of the metal from the head flange. The space formed by striking out portions of the head flange to form the toothed flanges 27, 28 provides draft means through said head flange. A suitable damper 29 is pivoted on the outer surface of the shell 22 and is adapted to be turned through an arc to close the hole 25 at times. The damper 29 is shown in open position in Fig. 6.

In the practical use of this device a match 17 may be passed through the hole 25 and between the side flanges 24$^b$, 24$^c$ until the head of sai dmatch contacts with the toothed flanges 27, 28, at which time the match may be twisted manually and be ignited by frictional engagement with the teeth of said flanges. After the match is ignited by engagement with the teeth of the flanges 27, 28 said match may be tilted manually into the position shown by dotted lines in Fig. 6 so as to bring the burning head of the match into close proximity to the top of wick 19, in which position the flame from the match will ignite the oil at the upper end of said wick. In either event, after the lighting of the oil in the wick by the burning head of the match, said match may be withdrawn through the hole in the burner or shell and such operation of withdrawal will extinguish the flame of the match. This provision makes for safety in disposing of the match after the wick of either device is lighted. In the case of the lantern or either device equipped with a damper to close the hole through which the match is inserted and withdrawn, said damper should be placed in closed position after the ignition of the wick is effected.

It will be observed that the introduction of the match in normal condition and igniting the same within the inclosure of the lamp or lantern is of great advantage in that said match is completely protected from drafts of air caused by air currents or wind or by travel of the lamp or lantern through the air such as on a carriage or railway train.

I claim as my invention:—

1. A lamp burner having a rim formed with a hole, and a stem mounted on said burner and having an ear extending through said hole and clenched on said rim, said stem being formed with a head flange having a slot and inclined toothed flanges on opposite sides of said slot, said toothed flanges adapted to ignite a match when said match is manually twisted in contact therewith.

2. A lamp burner having a transverse flame opening and also having a circumferential rim formed with a hole in line with said flame opening, and a stem mounted on said burner and formed with an ear extending through said hole and clenched on said rim, said stem also being formed with side flanges partially inclosing a space opening toward one end of said flame opening, said stem also being formed with a head flange directed toward said flame opening, said head flange being formed with a slot and inclined toothed flanges on opposite sides of said slot, said toothed flanges being adapted to ignite a match when said match is manually twisted in contact therewith.

Signed by me at Des Moines, Iowa, this tenth day of May, 1911.

EDWARD S. TAYLOR.

Witnesses:
S. C. SWEET,
EARL M. SINCLAIR.

---

Copies of this patent may be obtained for five cents each, by addressing the "Commissioner of Patents, Washington, D. C."